United States Patent
Hay et al.

(10) Patent No.: US 7,036,699 B1
(45) Date of Patent: May 2, 2006

(54) STROLLER/WHEELCHAIR ACCESSORY

(76) Inventors: Michelle R. Hay, 1381 Running Deer Dr., Auburn, PA (US) 17922; Annette M. Stanek-Busch, 804 Apache La., Temple, PA (US) 19560

(\*) Notice: Subject to any disclaimer, the term of this patent is extended or adjusted under 35 U.S.C. 154(b) by 336 days.

(21) Appl. No.: 10/665,767

(22) Filed: Sep. 17, 2003

Related U.S. Application Data

(60) Provisional application No. 60/412,724, filed on Sep. 23, 2002.

(51) Int. Cl.
*B60R 9/06* (2006.01)

(52) U.S. Cl. .................. 224/407; 224/409; 224/584; 224/572; 280/304.1

(58) Field of Classification Search .......... 224/401, 224/407, 409; 280/47.35, 304.1, 250.1; 190/18 A, 190/18 R; 383/33, 34, 34.1, 121.1, 106, 383/117
See application file for complete search history.

(56) References Cited

U.S. PATENT DOCUMENTS

| | | | |
|---|---|---|---|
| 1,844,872 A * | 2/1932 | Shipman | 383/23 |
| 2,288,996 A * | 7/1942 | Dubilier | 150/150 |
| 4,346,912 A | 8/1982 | Habib | 280/644 |
| D266,236 S | 9/1982 | Nakao | D12/129 |
| 4,506,903 A * | 3/1985 | Bowermaster | 280/304.1 |
| 4,577,903 A * | 3/1986 | Wells | 297/188.06 |
| 4,815,764 A | 3/1989 | Carpenter | 280/769 |
| 4,824,168 A | 4/1989 | Makoski | 297/229 |
| 4,830,238 A | 5/1989 | Widinski | 224/42.46 R |
| 4,949,842 A * | 8/1990 | Mokiao, II | 206/286 |
| 4,953,887 A | 9/1990 | Takahashi | 280/647 |
| D319,132 S * | 8/1991 | Marquardt | D34/23 |
| 5,288,001 A * | 2/1994 | Locarno | 224/407 |
| 5,464,183 A | 11/1995 | McConnell | 248/311.2 |
| 5,492,254 A * | 2/1996 | Challoner et al. | 224/586 |
| 5,544,904 A | 8/1996 | Maher | 280/47.35 |
| 5,702,038 A * | 12/1997 | Miller et al. | 224/409 |
| 5,743,651 A * | 4/1998 | Steinmetz | 383/33 |
| 5,794,957 A * | 8/1998 | Mendon | 280/204 |
| 5,863,061 A * | 1/1999 | Ziegler et al. | 280/642 |
| 5,941,437 A * | 8/1999 | Okumura | 224/585 |
| 6,155,592 A | 12/2000 | Hsia | 280/647 |
| 6,170,854 B1 | 1/2001 | Maher | 280/648 |
| 6,186,662 B1 * | 2/2001 | Jackson | 383/16 |
| 6,672,321 B1 * | 1/2004 | Hamilton | 135/67 |
| 6,799,707 B1 * | 10/2004 | Gibson | 224/609 |
| 6,892,915 B1 * | 5/2005 | Mares | 224/630 |

\* cited by examiner

*Primary Examiner*—Nathan J. Newhouse
*Assistant Examiner*—Justin M. Larson
(74) *Attorney, Agent, or Firm*—Miller Law Group, PLLC

(57) ABSTRACT

An accessory for strollers and wheelchairs will carry a substantial volume of packages while the stroller or wheelchair is being utilized. The accessory includes an upright wall having a floor portion and terminating in an upper access opening. The upright wall is fabricated from cloth to provide a flexible container with the central portion being fabricated from netting to permit a viewing of the interior of the container. Velcro strips at the top and bottom portions permit a detachable connection of the container to the frame and handle grips of the stroller or wheelchair. A rigid floor support member is received within pockets formed on the exterior surface of the floor portion. The floor support member includes wheels to engage the ground and support the weight of any objects within the container. The container can be folded into a compact transport configuration for easy storage when not in use.

20 Claims, 7 Drawing Sheets

STROLLER/WHEELCHAIR ACCESSORY

CROSS-REFERENCE TO RELATED APPLICATIONS

This application claims domestic priority on U.S. Provisional Patent Application Ser. No. 60/412,724, filed Sep. 23, 2002, the contents of which are incorporated herein by reference.

BACKGROUND OF THE INVENTION

The present invention relates generally to a stroller for transporting small children and to a wheelchair for transporting physically disabled people and, more particularly, to a package transportation accessory that can be detachably connected to the rear of the stroller or the wheelchair.

A number of efforts have been made to expand and enhance the function of a stroller used to transport small children. The conventional stroller is formed with a frame carrying typically four support wheels to provide mobility over the surface of the ground. Supported on this frame is a seat apparatus of some sort in which the small child is positioned for transport over the ground. Many different configurations of storage or transportation devices have been devised for attachment to the stroller frame to provide the ability to transport things in addition to the child. One particular use for such a storage device would be a basket supported beneath and/or behind the child's seat to contain items for transport.

In some cases, the stroller is configured for conversion between a stroller function and a shopping cart. U.S. Pat. No. 6,170,854, granted on Jan. 9, 2001, to Susan H. Maher, et al; and U.S. Pat. No. 5,544,904, issued on Aug. 13, 1996, to Jay A. Maher, are two examples of strollers that are convertible between the stroller and shopping cart functions. In the '854 patent, the frame is configured to support a rigid seat device that can be removed to permit fabric and mesh enclosures to be detachably connected to the frame to form a makeshift shopping cart. Similarly, the '904 patent depicts a stroller structure having a fabric and mesh receptacle that can be stored behind the child's seat in an inoperable position, or deployed over the seat to form a makeshift shopping cart. In neither of the configurations represented in the '854 or '904 patents can the stroller frame be used simultaneously in both the stroller function, i.e. for the transportation of small children, and the shopping cart function, i.e. to transport a significant number of packages.

Other devices have been devised to hang from the handle bar or push bar of the stroller apparatus to increase the ability of the stroller to transport items other than the child. Typically, such devices are small to permit the transport of personal items, such as is taught in U.S. Pat. No. 4,815,764, issued on Mar. 28, 1989, to Dianne M. Carpenter; U.S. Pat. No. 4,824,168, issued on Apr. 25, 1989, to Kathyrn J. Makoski; U.S. Pat. No. 4,830,238, issued on May 16, 1989, to Paul R. Widinski, et al; U.S. Pat. No. 5,464,183, issued on Nov. 7, 1995, to Thomas E. McConnell, et al; U.S. Pat. No. 5,702,038, issued on Dec. 30, 1997, to Judith A. Miller, et al; and U.S. Pat. No. 5,941,437, issued on Aug. 24, 1999, to Kimberly H. Okumura. While all of these carrying or organizing devices are detachably mounted to the handle apparatus of the stroller, none of these devices are suitable for carrying a significant number of packages, particularly packages of the size typically acquired during shopping.

Other devices have been created to contain a larger volume of packages or other items besides the child. Particular reference to such devices can be made to U.S. Pat. No. 4,346,912, issued on Aug. 31, 1982, to Linda Habib; U.S. Design Pat. No. D266,236, granted on Sep. 21, 1982, to Shinroka Nakao, et al; U.S. Pat. No. 4,953,887, issued on Sep. 4, 1990, to Takehiko Takahashi, et al; and U.S. Pat. No. 6,155,592, issued on Dec. 5, 2000, to Ben M. Hsia. In such devices, these basket substitutes are suspended from the frame of the stroller apparatus and are limited in terms of weight and volume due to the limited support received from the stroller frame. Clearly, these devices are capable of carrying more items that the personal organizers identified above, yet none of these devices are capable of transporting a significant volume of packages.

One particular need for the expanded or enhanced carrying function of strollers is associated with grocery shopping. Neither the personal organizers, nor the larger basket substitute, described above, are capable of transporting any significant amount of groceries at the same time as providing a seat for the child. While grocery shopping presents a good example of a situation where a significant amount of carrying ability is required for items to be transported in addition to the child, other similar situations often arise.

An accessory that can be detached from the stroller frame should also be capable of storage with the stroller, whether temporarily or on a long term basis. While the fabric and mesh receptacles of the two Maher patents can be collapsed, the Takahashi and Hsia basket substitutes cannot. Furthermore, such an accessory needs to be able to accommodate a substantial volume of items without sacrificing the stability of the stroller to which it is mounted. Limiting either the weight of the volume of the items in the receptacle due to the insubstantial connection between the receptacle and the frame of the stroller, or due to the strength of the stroller frame itself, is a factor that needs to be overcome with respect to providing an accessory for carrying items behind the stroller frame.

With respect to the need to provide an apparatus to help transport packages or other things, a wheelchair is not unlike a child's stroller. Both are wheeled carriages having a second person hand grip without adequate capabilities to carry packages and other miscellaneous objects. Accordingly, the disadvantages of strollers as described above are equally applicable to wheelchairs.

It would, therefore, be desirable to provide a stroller accessory that will overcome the disadvantages of the prior art to provide an apparatus for transporting a substantial volume of packages or other items at the same time the stroller is being used to transport a child. It would also be desirable that the stroller accessory be capable of storage on the stroller frame to permit the stroller to be folded in a normal manner for transport in an inoperative position from place to place.

SUMMARY OF THE INVENTION

It is an object of this invention to overcome the aforementioned disadvantages of the prior art by providing an accessory apparatus that is attachable to strollers to permit the transportation of a substantial volume of packages or other items in conjunction with the movement of the stroller.

It is another object of this invention to provide an apparatus that can be attached to a stroller or to a wheelchair to carry packages and other objects therein while utilizing the stroller or wheelchair.

It is an advantage of this invention that the weight of the packages and other objects within the confines of the accessory is carried by the accessory.

It is a feature of this invention that the container is fabricated from cloth to provide a flexible storage receptacle.

It is another feature of this invention that the accessory includes a rigid floor support that includes ground engaging wheels to support the weight of objects within the container.

It is another advantage of this invention that the accessory is selectively detachable from the carriage for which the accessory is to be utilized.

It is still another object of this invention that the container accessory for strollers and other similar carriages is configurable in an upright operating position or a folded transport orientation.

It is yet another object of this invention to provide a transparent panel in the central part of the container structure that permits at least a partial viewing of the contents of the container.

It is yet another feature of this invention that the central portion of the container walls is formed from netting material to provide the ability to view objects within the confines of the interior of the container.

It is still another feature of this invention that attachment strips are attached to the upright walls to permit selective attachment of the container to the frame and handle grips of the carriage.

It is yet another advantage of this invention that the attachment strips are formed from hook-and-loop fasteners strips.

It is a further feature of this invention that the rigid floor support member is detachably mounted in a pocket formed in the floor portion of the container.

It is a further advantage of this invention that the pocket is formed as two pocket members that are positioned on opposing sides on the bottom surface of the floor portion of the container.

It is a further object of this invention to provide a portable storage container that can be utilized either on children's strollers or on wheel chairs.

It is still a further feature of this invention that the floor portion of the container is provided with a mounting strip that can be used alternatively to restrain the folded container in the transport orientation or to encircle the floor support member for ensuring attachment of the floor portion of the container to the floor support member when the accessory is in the operating position.

It is yet another object of this invention to provide an accessory for strollers and wheelchairs that is capable of transporting a substantial volume of packages and other objects and that is durable in construction, inexpensive of manufacture, carefree of maintenance, facile in assemblage, and simple and effective in use.

These and other objects, features and advantages are accomplished according to the instant invention by providing an accessory for strollers and wheelchairs to carry a substantial volume of packages and other objects while the stroller or wheelchair is being utilized. The accessory includes an upright wall extending upwardly from a floor portion and terminating in an access opening at the top portion. The upright wall is fabricated from cloth to provide a flexible container with the central portion being fabricated from netting to permit a viewing of the interior of the container. Velcro strips at the top and bottom portions permit a detachable connection of the container to the frame and handle grips of the stroller or wheelchair. A rigid floor support member is received within pockets formed on the exterior surface of the floor portion. The floor support member includes wheels to engage the ground and support the weight of any objects within the container. The container can be folded into a compact transport configuration for easy storage when not in use.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
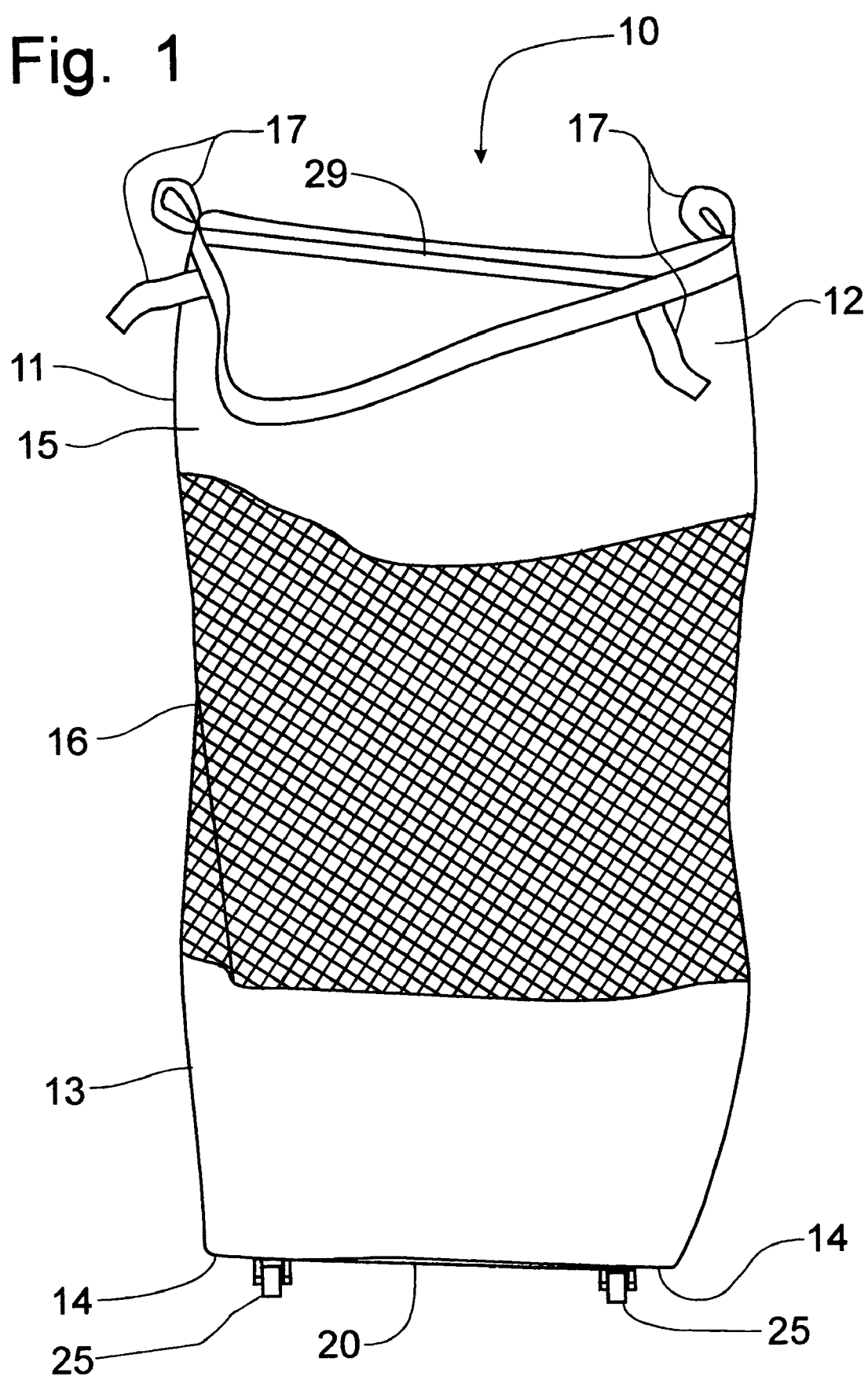
FIG. 1 is a rear elevational view of the stroller accessory incorporating the principles of the instant invention, the flexible container forming the package receptacle being expanded to substantially full length as would occur when mounted on a stroller frame.
Figure 2:
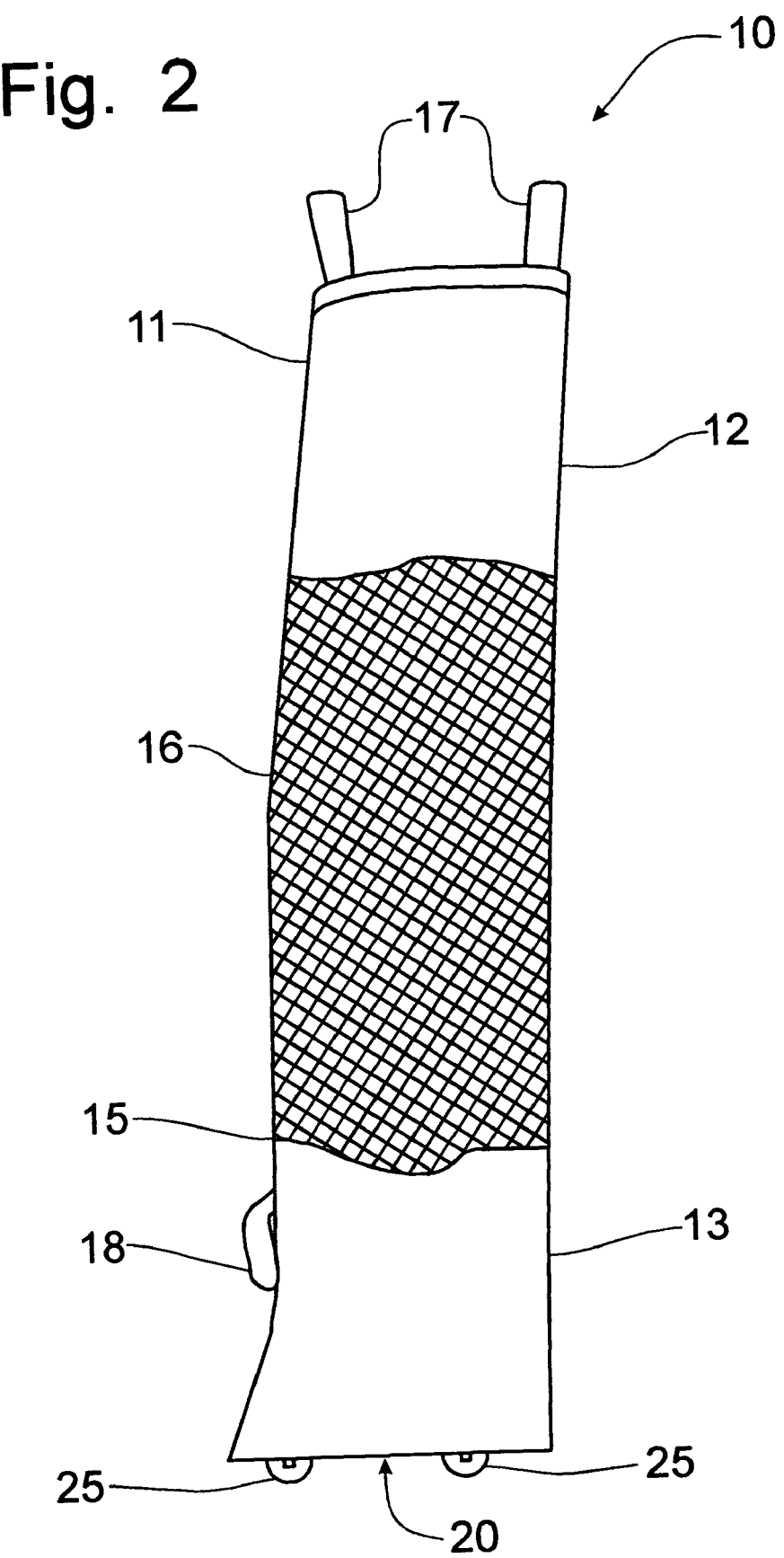
FIG. 2 is a left side elevational view of the stroller accessory depicted in FIG. 1.

Referring now to FIGS. 1–7, a stroller accessory incorporating the principles of the instant invention can best be seen. Any left, right, front and rear references are made as a matter of convenience and are determined by mounting the accessory to the rear portion of the stroller frame with the forward face of the accessory being adjacent to the stroller frame. The accessory 10 is formed as a flexible container 11 with an open top portion 12 oriented at the top of the expanded container 11, a closed bottom portion 13 and sidewall portions 15 interconnecting the top and bottom portions 12, 13. The container 11 is formed of fabric to provide a flexible container 11 having a somewhat adaptable shape, yet retain objects within the container 11 inside the side wall portions 15. The side portions 15 of the container 11 are formed of mesh or netting and fabric to provide a generally transparent center portion 16 of the side portions 15 so that the objects within the confines of the container 11 are generally visible from outside the container 11. The top portion 12 forming the top opening and the bottom portion 13 are formed of substantial fabric material, such as denim, so as to provide structural support for the fastening devices, as will be described in greater detail below. A support rod 29 is preferably sewn into the top portion 12 at the opening between two of the fastening devices to provide rigidity to this part of the top portion 12 to keep the container 11 adjacent to the stroller 30 or wheelchair 40, as will also be described in greater detail below.

The flexible container 11 is provided with hook and loop (Velcro) fastener strips 17, 18 at the top and bottom portions 12, 13. Four top fastener strips 17 are affixed to the fabric top portion 12, with two fastener strips 17 at the front and two additional fastener strips 17 at the rear, to provide adequate support for the container 11 from the handle bar 35 and frame members 38 of the stroller 30, as will be described in greater detail below. Two additional hook and loop fastener strips 18 are affixed to the fabric bottom portion 13 below the central mesh portion 16 of the side walls 15. The fastener strips 18 are intended to attach the sidewall 15 and bottom portion 13 to the frame members 34 of the stroller 30 to prevent the container 11 from separating from the stroller frame 31.

Figure 3:
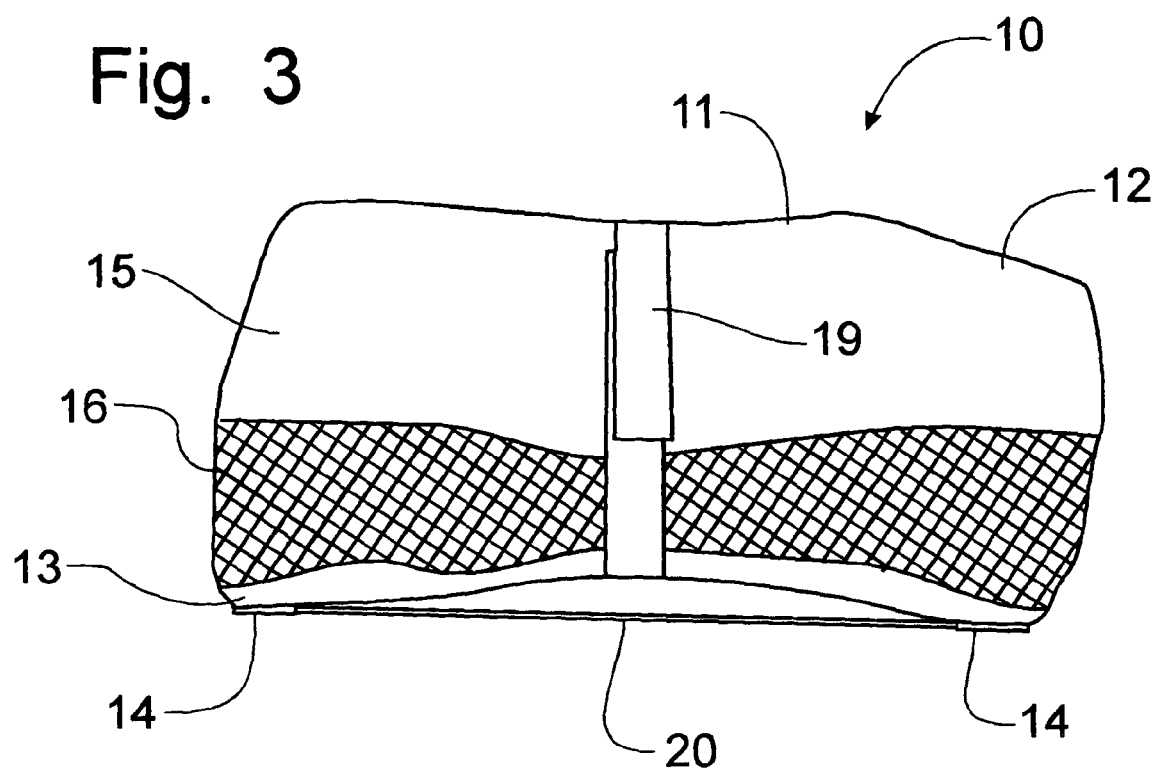
FIG. 3 is rear elevational view of the stroller accessory folded into a compact transport configuration for storage on the stroller or elsewhere, the velcro fastening strips used to retain the rigid panel in the operative position encircling the folded flexible container to keep the accessory in the folded transport configuration.
Figure 4:
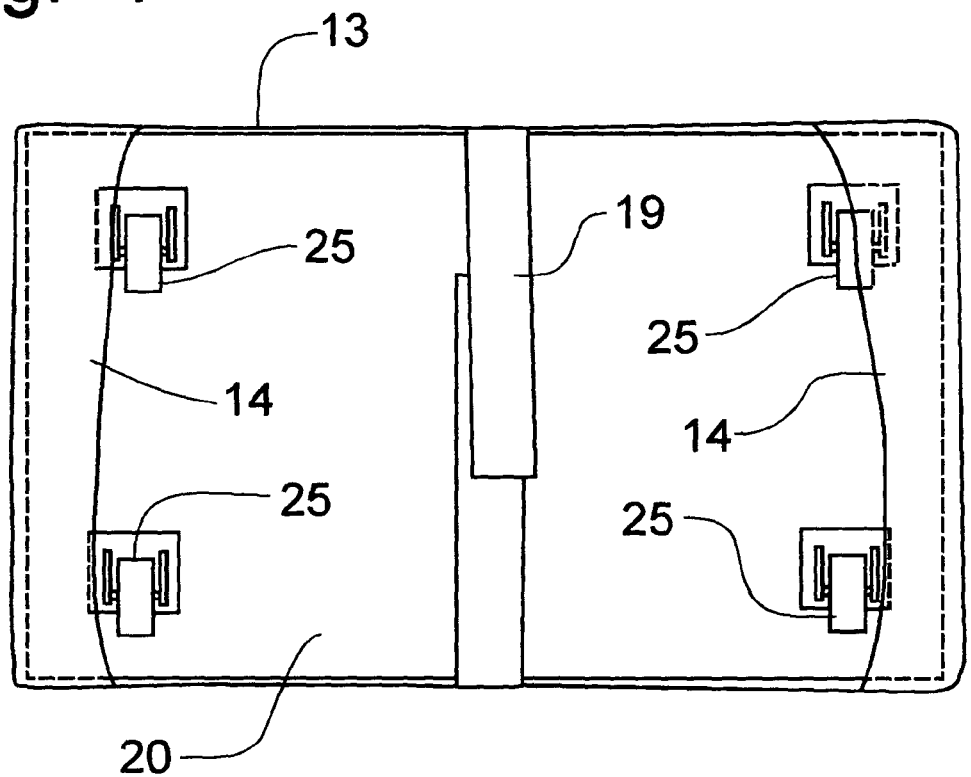
FIG. 4 is a bottom plan view of the stroller accessory depicted in FIGS. 1–3, the rigid support panel being depicted in its engaged position and retained by velcro fastening tape.

As best seen in FIGS. 1–5, the accessory 10 further includes a rigid floor support panel 20 preferably formed of wood, fiberboard, metal or plastic to provide support for the bottom portion 13 of the container 11. The rigid floor support panel 20 is formed with ground engaging wheels 25 mounted to the bottom surface 23 of the panel 20 to provide mobile support for the bottom portion 13. The rigid support panel 20 is sized to be received within pockets 14 formed on the left and right sides of the bottom portion 13 to detachably connect the support panel 20 to the bottom portion 13 of the container 11. As best seen in FIG. 4, the ground engaging wheels 25 are oriented on the panel 20 to be positioned adjacent to, but outside of, the respective pocket 14. The bottom portion 13 of the container 11 is also equipped with a retainer strap 19 that is operable to wrap around the support panel 20, as is depicted in FIG. 4 to further attach the bottom portion 13 to the support panel 20.

Figure 5:
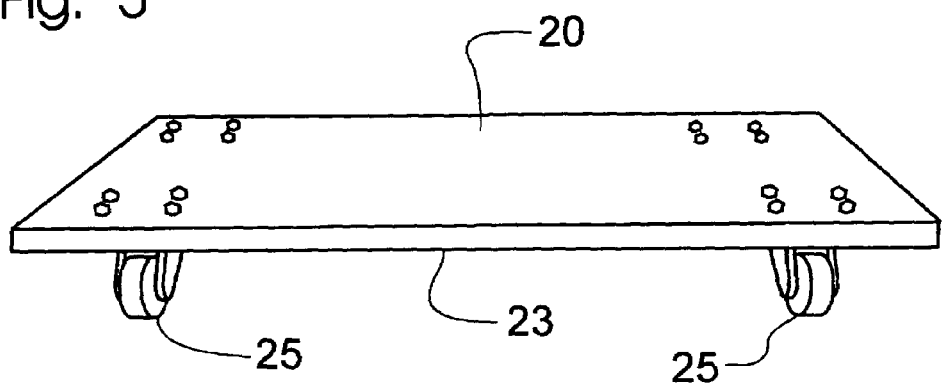
FIG. 5 is an upper, front perspective view of the support panel removed from the flexible container.
Figure 6:
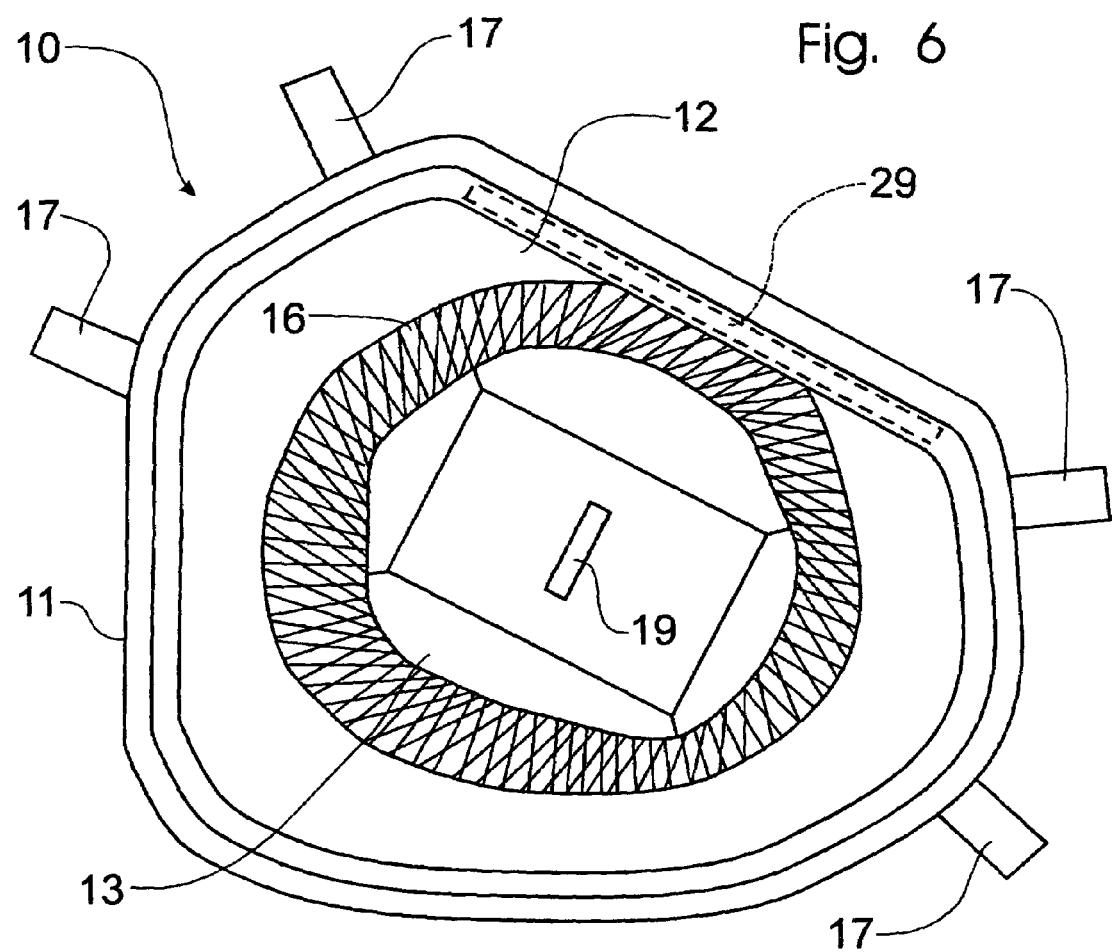
FIG. 6 is a top plan view of the stroller accessory shown in FIGS. 1–2 looking into the open mouth of the flexible container toward the lower portion supported by the rigid support panel.

Referring now to FIGS. 3 and 4, one skilled in the art will recognize that the flexible container 11 can be folded into a compact package against the rigid support panel 20. The retainer strap 19 that held the rigid support panel 20 against the bottom portion 13 of the container 11, when fully deployed into the expanded operative configuration depicted in FIGS. 1, 2, 7 and 10, can be disengaged from the support panel 20 and wrapped in the opposite direction around the folded flexible container 11 to hold the container 11 in this compact folded configuration during storage. The rigid support panel 20, as best seen in FIG. 5 can be retained within the pockets 14 to keep the entire accessory 10 in the folded compact transport configuration. Alternatively, the rigid support panel 20 can be removed from the pockets 14 and stored separately from the folded container 11.

Figure 7:
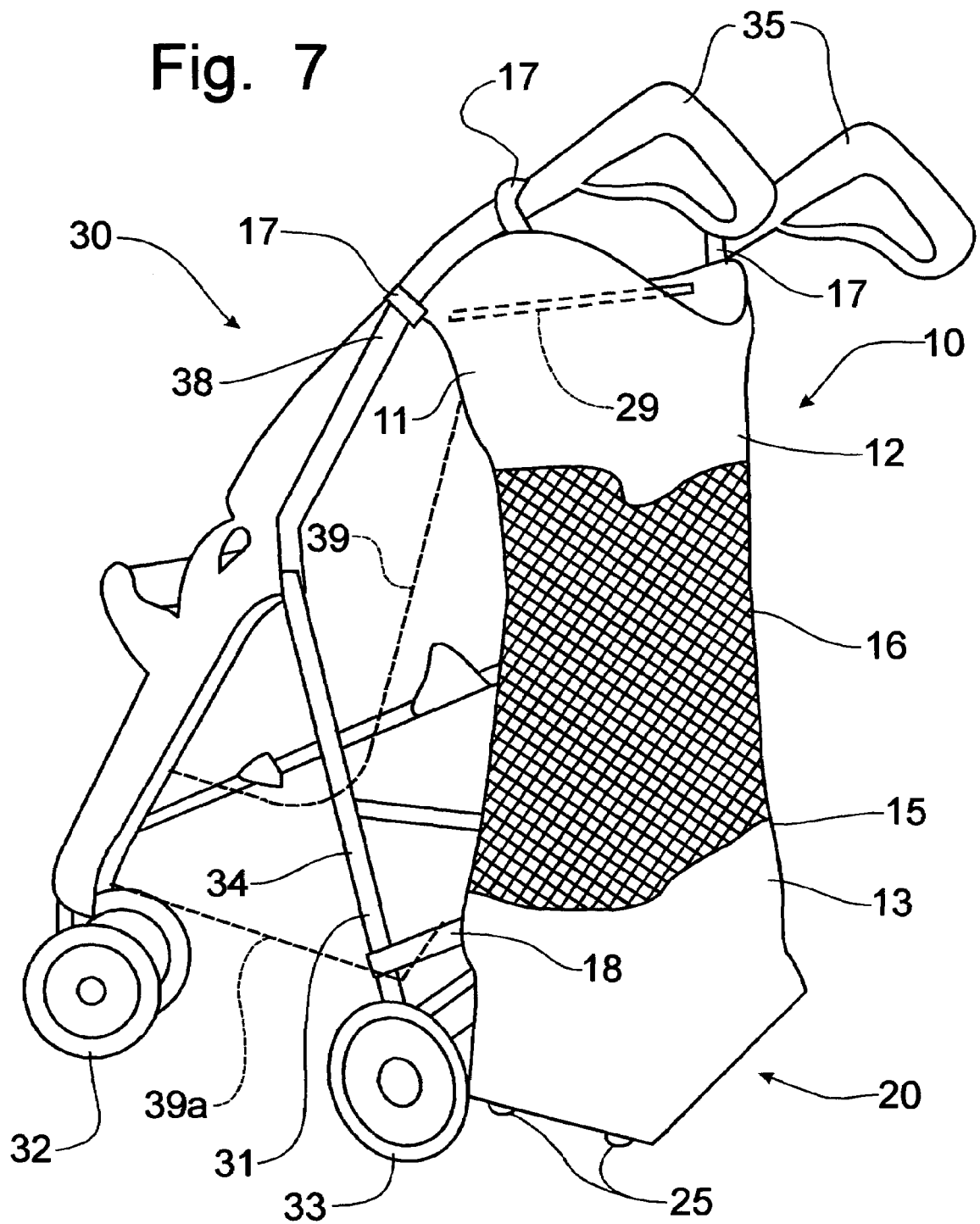
FIG. 7 is a left, rear perspective view of the stroller accessory mounted to the conventional stroller.
Figure 8:
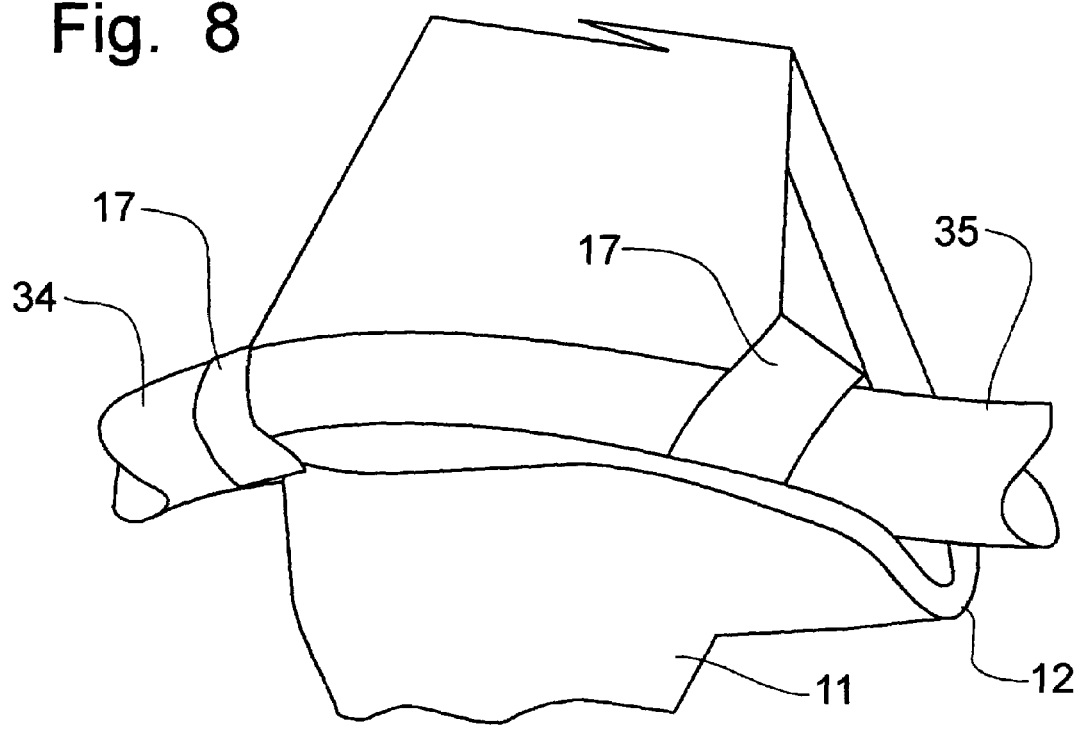
FIG. 8 is an enlarged upper left perspective view of the handle bar of the stroller depicting the mounting of the stroller accessory thereto.
Figure 9:
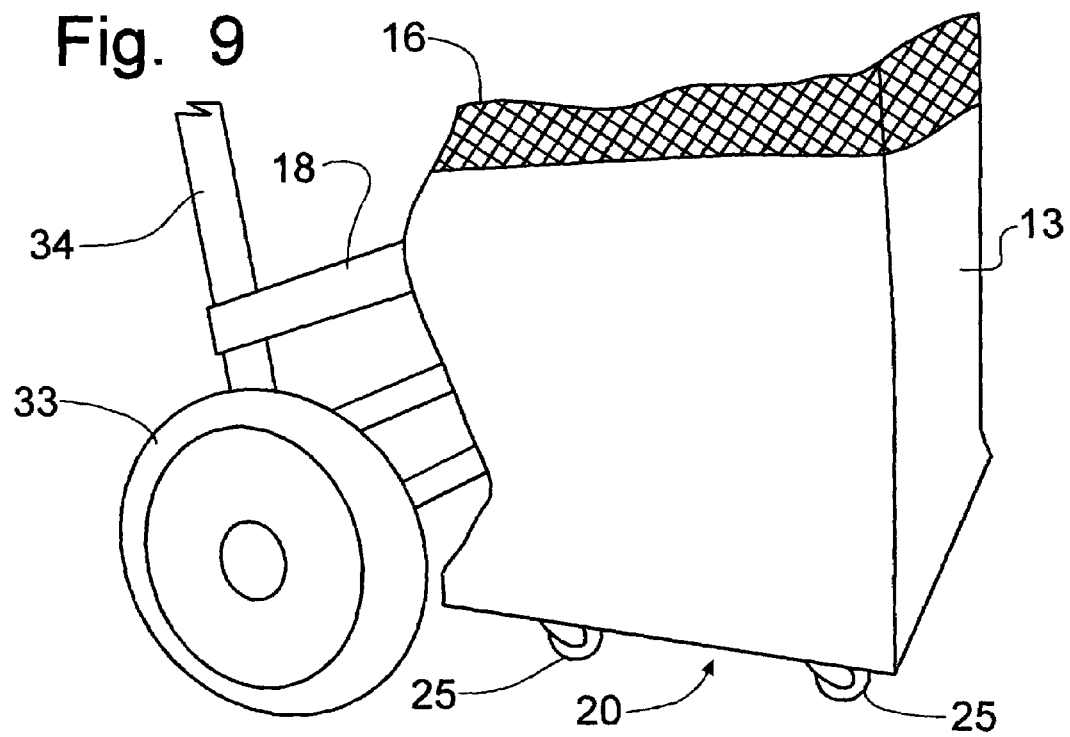
FIG. 9 is an enlarged perspective view of the bottom portion of the stroller accessory mounted to the frame of the stroller and supported on the surface of the ground rearwardly of the back wheels of the stroller.

Referring now to FIGS. 7–9, the mounting of the accessory 10 on the stroller 30 can best be seen. The stroller 30 includes a conventional frame 31, which can be formed in many different configurations, depending on the specific manufacturer thereof. Each stroller frame 31, irrespective of the manufacturer has a few common features. Every stroller frame 31 will include at least one forward ground engaging wheel 32 and a pair of rearward ground engaging wheels 33, although the actual configuration of the particular wheels may vary. Supporting the respective wheels 32, 33 will be elongated frame members 34. Furthermore, each manufactured stroller 30 will have a handle apparatus 35 which can be in the form of transversely spaced handles (not shown) or a push bar that extends transversely between frame member. The child's seat 39 is appropriately positioned between the frame members 34 forwardly of the location for mounting the accessory 10 from the handle apparatus 35.

The container 11 in the expanded configuration, as seen in FIG. 7, can be mounted to the stroller 30 by wrapping the four top fastener strips 17 to the handle apparatus 35 and the upper part 38 of the frame members 34 to provide vertical support for the container 11 from the upper portions of the stroller frame 31. To keep the bottom portion 13 of the container 11 from separating rearwardly from the stroller 30, the bottom fastener strips 18 can be wrapped around the elongated frame members 34 above the rear wheels 33. In each instance, the fastener strips 17, 18 are closed upon themselves to fasten to the respective frame member 34, 38 or handle apparatus 35.

Figure 10:
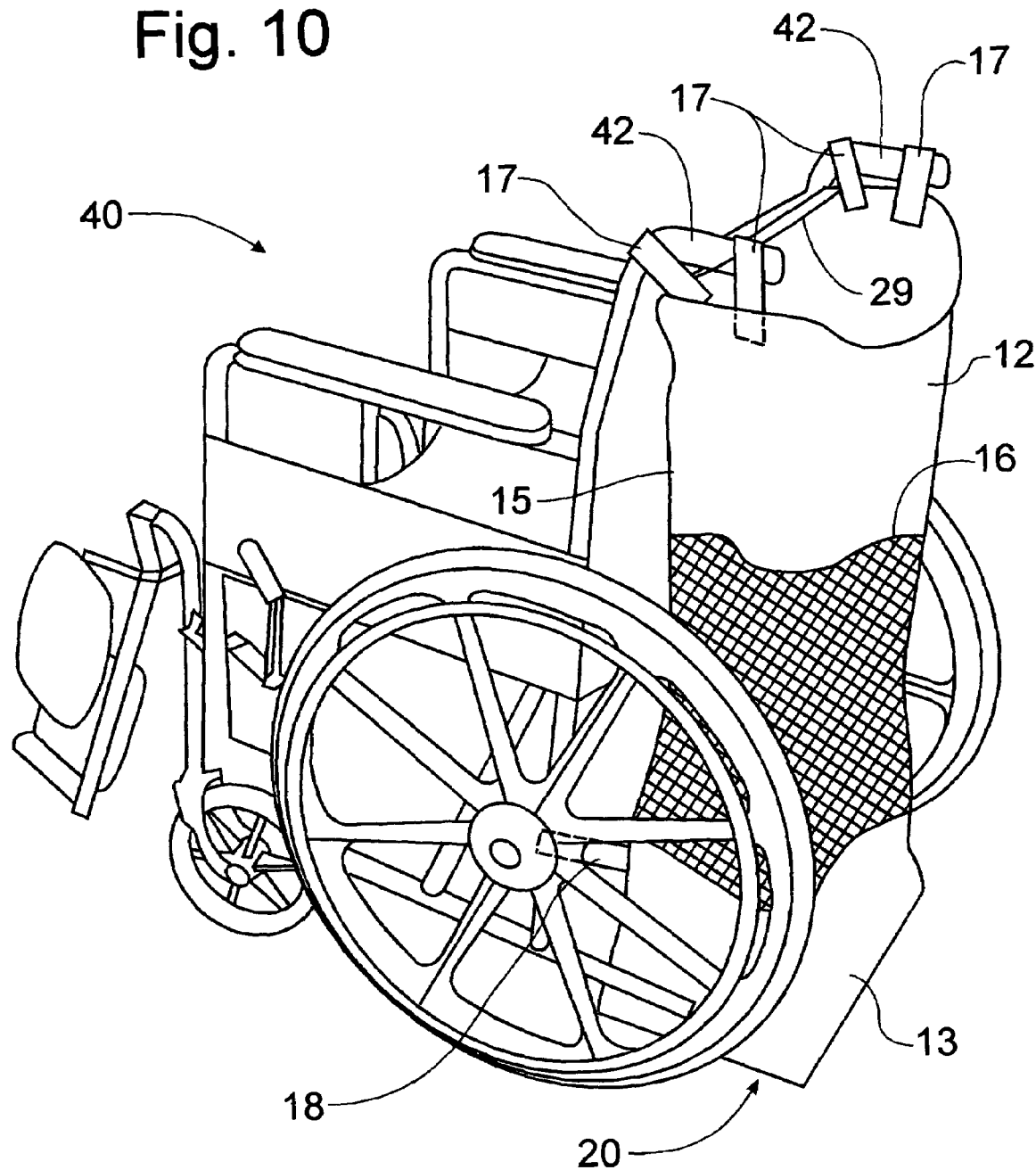
FIG. 10 is a left, rear perspective view of the stroller accessory mounted to the conventional wheelchair.

When mounted in this manner, the rigid support panel 20 is resting on the ground (or floor) immediately rearwardly of the rear wheels 33 of the stroller 30. With the rigid support panel 20 resting on the floor, a significant amount of items can be placed into the container 11 and towed through the fastener strips 17, 18 behind the stroller 30. The wheels 25 mounted on the rigid support panel 20 are castered so that there is no directional component to the movement of the accessory 10, even when loaded with a substantial amount of packages. The open top portion 12 of the container 11 can be supported from the handle apparatus 35 and the associated frame members 34, 38 in such a manner as to provide a gapped front edge of the container 11 to facilitate the loading of packages therein. A stiffening rod 29 can be sewed into the front edge of the opening between two opposing upper attachment straps 17 to keep the front edge adjacent to the stroller 30 (or wheel chair 40 as is best seen in FIG. 10). The transparent central mesh portion 16 of the container 11 permits a convenient inspection into the container 11 for use within stores.

The folded flexible container 11, particularly with the rigid support panel 20 removed from the bottom portion 13, can be folded upwardly without the top fastener strips 17 being removed from the stroller 30, thus suspending the flexible container 11 from and storing the container 11 against the handle apparatus 35 or an alternative conventional push bar (not shown). The retainer strap 19 can be utilized to wrap around the folded flexible container 11 to retract the flexible container 11 into the retracted configuration adjacent the push bar 36. Accordingly, the accessory 10 can be compactly stored when not needed, yet be conveniently available and deployed easily and effectively with minimal effort.

One skilled in the art will recognize that storage of the folded accessory 10 can be found within the frame 31 of the stroller 30, particularly beneath the child's seat 39 and/or beneath the handle apparatus 35, so that the entire stroller 30 can be collapsed into its customary inoperative transport configuration. In this configuration, the rigid support panel 20 is removed from the pockets 14 of the bottom portion 13 and stored separately from the flexible container 11, such as in the stroller basket 39a. Accordingly, the large receptacle formed by the expanded container 11 can be compactly stored and carried with the stroller frame 31 without disrupting the ability of the stroller 30 to fold into its inoperative configuration as the stroller was designed to accomplish.

A stroller accessory 10 constructed and mounted as described above is capable of supporting and storing for transport a substantial amount of packages and other items. The weight of the stored items is supported directly on the floor behind the stroller 30 through the support panel 20 bearing directly on the floor instead of hanging from the frame 34, 38 of the stroller 30. The movement of the accessory 10 is controlled by the movement of the stroller 30 through the fastener strips 17, 18 interconnecting the frame 34, 38 of the stroller 30 and the flexible container 11. When the storage capability is not needed, the accessory 10 can be folded and stored within the confines of the stroller 30 in a manner that will not interfere with the folding of the stroller 30 itself into an inoperative transport configuration. Accordingly, the stroller accessory 10 is inexpensive to manufacture, carefree in maintenance, and simple and effective to use.

As is depicted in FIG. 10, the accessory 10 can be equally utilized on wheel chairs 40 to provide a capability of carrying a substantial volume of packages or other objects while the wheel chair 40 is being utilized. Mounting of the accessory 10 is substantially identical to that described above with respect to strollers 30 with the upper Velcro straps 17 being used to mount the container 11 to the handle grips 42 of the wheel chair 40 and the lower Velcro fastener strips being used to connect the container 11 to the frame of the wheel chair 40.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. An accessory for wheeled carriage having a frame supported on the ground by wheels and terminating in hand grips for manually pushing the carriage over the surface of the ground, comprising:

a container defined by upright walls formed of flexible material, said upright walls including attachment devices operable to detachably mount said container to said carriage, said walls being joined to a floor member at a lower terminus thereof, said attachment devices positioning said container adjacent said carriage so as to extend vertically between said hand grips and the surface of the ground, a portion of the weight of said container being supported on said hand grips by said attachment devices; and a rigid floor support connected beneath said floor member and having a plurality of wheels affixed thereto for support of said floor support on the surface of the ground when said container is mounted to said carriage, said floor support supporting at least a portion of said container and any items carried in said container when said container is mounted to said carriage.

2. The accessory of claim 1 wherein said rigid floor support is received within a pocket formed on the lower surface of said floor member to be selectively detachable therefrom.

3. The accessory of claim 2 wherein said floor member includes a mounting member that is operable to wrap around said floor support for detachable engagement thereof when received within said pocket.

4. The accessory of claim 3 wherein said mounting member is a hook-and-loop strip that is sewed onto said floor member, said upright walls and said floor member of said container being formed from cloth and being collapsible into a transport configuration against said floor support when detached from said carriage, said hook-and-loop strip being operable to wrap around said collapsed container to maintain said transport configuration.

5. The accessory of claim 3 wherein said upright walls are formed from cloth material into a circumferential enclosure around said floor member, said attachment devices being hook-and-loop strips attached to said upright walls.

6. The accessory of claim 5 wherein two of said attachment devices are attached to an upper portion of said upright walls to facilitate engagement with said hand grips of said carriage and two of said attachment devices are attached to a lower portion of said upright walls to facilitate engagement with said frame of said carriage.

7. The accessory of claim 6 wherein two of said attachment devices are affixed to opposing sides of said upper portion of said upright walls to provide two attachment devices for each hand grip.

8. The accessory of claim 7 wherein said upper portion terminates in an opening through which access into said container can be gained, said upper portion including a stiffening rod extending between two of said opposing attachment devices positioned adjacent said carriage when mounted thereto.

9. The accessory of claim 3 wherein said upright walls are formed from cloth material defining an upper portion, a central portion and a lower portion, said lower portion being attached circumferentially to said floor member, said central portion being formed from semi-transparent material to permit a viewing of any contents within said container.

10. The accessory of claim 9 wherein said pocket is formed as a first pocket member on one side of said floor member and a second pocket member on an opposing side of said floor member, said floor support spanning between said first and second pocket members.

11. An apparatus detachably connectable to a wheeled carriage to carry items therein, said wheeled carriage including a frame terminating in hand grips for manually pushing said wheeled carriage over the surface of the ground, comprising:

an upright wall formed of flexible material, said upright wall including attachment devices operable to detachably mount said upright wall to said carriage, said walls being joined to a floor portion at a lower terminus thereof, said upright wall being configurable in an operating position in which said attachment devices are engaged with said carriage and in a transport position in which said upright wall is folded against said floor portion; and a rigid floor member connected beneath said floor portion and having a plurality of wheels affixed thereto for support of said floor member on the surface of the ground when said container is in said operating position mounted to said carriage, said floor member supporting at least a portion of any items carried in said apparatus when mounted to said carriage, said apparatus being supported in said operating position simultaneously by said attachment devices affixed to said carriage and by said rigid floor member engaging the surface of the ground.

12. The apparatus of claim 11 wherein said upright wall is formed from cloth material defining an upper portion, a central portion and a lower portion, said lower portion being attached circumferentially to said floor portion, said central portion being formed from semi-transparent material to permit a viewing of any items within said apparatus.

13. The apparatus of claim 12 wherein said rigid floor member is received within a pocket formed on an external lower surface of said floor portion to be selectively detachable therefrom.

14. The apparatus of claim 13 wherein said floor portion includes a mounting member that is operable to wrap around said floor member for detachable engagement thereof when received within said pocket.

15. The apparatus of claim 14 wherein said attachment devices and said mounting member are hook-and-loop strips attached respectively to said upright wall and said floor portion, two of said attachment devices being attached to said upper portion of said upright wall to facilitate engagement with said hand grips of said carriage and two of said attachment devices are attached to said lower portion of said upright walls to facilitate engagement with said frame of said carriage.

16. The apparatus of claim 15 wherein said mounting member wraps around said folded upright wall when in said transport position and around said floor member when in said operating position.

17. The apparatus of claim 16 wherein said pocket is formed as a first pocket member on one side of said floor member and a second pocket member on an opposing side of said floor member, said floor support spanning between said first and second pocket members.

18. The apparatus of claim 17 wherein said upper portion terminates in an opening through which access into said container can be gained, said upper portion including a stiffening rod extending between two of said opposing attachment devices for support of said opening adjacent said carriage when in said operating position.

19. The apparatus of claim 18 wherein said carriage is a stroller which is convertible into a folded transport configuration, said upright wall and said floor member being positionable against said stroller when in said transport configuration without requiring detachment thereof.

20. An accessory for wheeled carriage having a frame supported on the ground by wheels and terminating in hand grips for manually pushing the carriage over the surface of the ground, comprising:

a container defined by upright walls formed of flexible material, said upright walls including attachment devices operable to detachably mount said container to said carriage, said walls being joined to a floor member at a lower terminus thereof; said floor member being formed with pockets on a lower portion thereof;

a rigid floor support connected beneath said floor member and having a plurality of wheels affixed thereto for support of said floor support on the surface of the ground when said container is mounted to said carriage, said floor support supporting at least a portion of any items carried in said container when mounted to said carriage, said floor support being selectively mounted within said pockets; and a mounting member operable to wrap around said floor support for detachable engagement thereof when said floor support is engaged within said pocket to fix said container in an upright operative configuration, said mounting member being alternatively positionable to wrap around said container when collapsed against said floor member in a transport configuration.

\* \* \* \* \*